Jan. 31, 1928.
M. W. WALLACE
1,657,946
NONPUNCTURABLE AUTOMOBILE WHEEL
Filed June 3, 1927
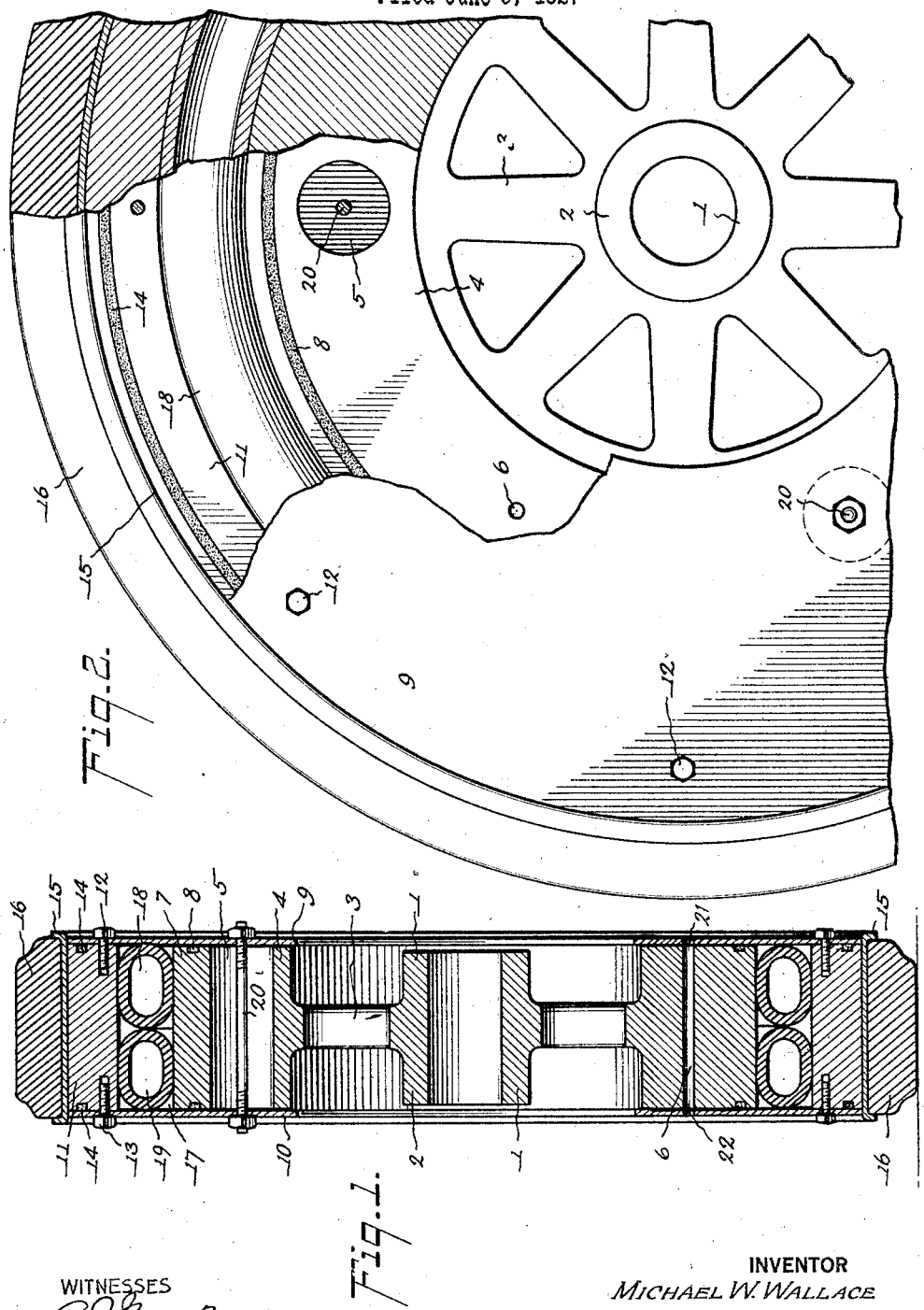
WITNESSES
INVENTOR
MICHAEL W. WALLACE
BY
ATTORNEY Patented Jan. 31, 1928.

1,657,946

UNITED STATES PATENT OFFICE.

MICHAEL W. WALLACE, OF ROCK ISLAND, ILLINOIS.

NONPUNCTURABLE AUTOMOBILE WHEEL.

Application filed June 3, 1927. Serial No. 196,271.

This invention relates to vehicle wheels, and particularly to an improved automobile wheel of the semipneumatic type, the object being to provide an improved construction of wheel which will have substantially the resiliency of a pneumatic wheel while being non-puncturable.

Another object of the invention is to provide a cushioned or pneumatic wheel structure wherein means are provided for permitting the pneumatic feature to function until injured, and then causing the wheel to act as a solid wheel.

A further object, more specifically, is to provide a wheel for automobiles, wherein a solid center section is provided, an outer stiff section provided, intermediate pneumatic members for holding the outer section resiliently in a given position, together with means for clamping the outer section and inner section so as to permit the outer section and inner section to function without the pneumatic members.

In the accompanying drawing—

Figure 1 is a diametrical vertical sectional view through a wheel, disclosing an embodiment of the invention.

Figure 2 is a view partly in elevation and partly in section, showing the structure illustrated in Figure 1, the wheel shown in Figure 2 being on an enlarged scale.

Referring to the accompanying drawing by numerals, 1 indicates a hub forming part of the inner section 2, said inner section being in reality a wheel of metal or other suitable material, preferably provided with suitable spokes 3 merging into an annular solid rim 4. The rim 4 is provided with a number of large openings 5 and a number of small openings 6, the openings 5 being equally spaced apart, and on the drawing are shown as being three in number. The openings 6 are also shown as three in number and spaced between the openings 5. If desired, a greater number of openings could be provided of each kind without departing from the spirit of the invention. The rim 5 is also provided with a pair of annular grooves 7 containing suitable packing 8, whereby the side plates 9 and 10 are permitted to snugly fit against the packing to make a substantially air-tight connection, but allow a comparatively easy movement between the respective plates and the ring 4. A felly or outer ring 11 of metal or other material is provided and rigidly secured to plates 9 and 10 by a number of screws or bolts 12 and 13. Suitable grooves 14 on each side of felly 11 are provided, and each of these grooves is provided with packing to make a tight connection between the various parts. A tire carrying rim 15 is secured in any desired manner to the felly 11 and on the ring 15 is mounted a rubber tire 16 of any desired kind, as for instance, a solid tire. The felly 11 is appreciably greater in diameter than the ring 4, whereby a space 17 is provided in which the pneumatic members 18 and 19 are placed. These pneumatic members may be of any desired construction, though as shown in the drawing, they are endless pneumatic tubes carrying air under considerable pressure. In order to provide the air, suitable valves and valve stems may be supplied, of the usual kind found on inner tubes now on the market. Preferably, the members 18 and 19 are placed in position and then pumped to the desired pressure, and then the plates 9 and 10 clamped in position as shown in Figure 1. For many purposes, the members 18 and 19 need not be inflated but merely hollow endless tubular members presenting cushions, either filled or not filled, as desired. Where they are filled with air or gas, they may be sealed and used in that manner.

After the parts have all been assembled as shown in Figure 2, and the various bolts 20 passed through suitable apertures in plates 9 and 10 and through the openings 5, the wheel is in condition for use and when used, there will be a relative movement between the outer section and the inner section, cushioned by members 18 and 19. As the bolts 20 do not engage section 2, this independent movement is permitted. If the tubular members 18 and 19 should be punctured or collapsed for any cause, the bolts 20 are removed from the openings 5 and placed in the respective apertures 21 and 22 and the holes or apertures 6. In the accompanying drawing, three holes 6 are illustrated, but it will be evident that a greater number could be used if desired. When the bolts 20 are arranged in the holes 6, the side plates are bolted firmly to section 2 and, consequently, hold this section centrally in respect to the outer section. This adjustment causes the wheel to assume a rigid structure with the rubber tire 16 presenting the only cushion effect. When the parts are adjusted in this manner, the wheel acts as a solid wheel, and in an emergency, may be driven a few miles or many miles, and the members 18 and 19 repaired at an opportune time. After the members 18 and 19 have been repaired, and the plates 9 and 10 again placed in position, bolts 20 are again shifted so as to pass through the openings 5 whereby the resilient action of members 18 and 19 will be utilized.

What I claim is:

1. A non-puncturable automobile wheel, comprising an inner wheel section having a hub, an outer wheel section formed with a rim, means including a tire mounted on said rim, a pair of side plates, means for securing said side plates rigidly to said rim, said side plates overlapping part of said central wheel section, said central wheel section having a plurality of openings therethrough, a bolt extending through each of said openings without contacting with the walls thereof, said bolts acting to clamp said plates against said wheel section, said central wheel section and said side plates being also provided with a plurality of holes of substantially the same diameter as said bolts, said bolts being adapted to be shifted from said openings to a position extending through said holes whereby said plates are locked rigidly to said central wheel section, and a pneumatic structure arranged between said wheel section and said rim and between said plates whereby movement of the rim or wheel section independently of each other will be cushioned by said pneumatic means when said bolts are extending through said openings.

2. A wheel of the character described, comprising a wheel section, a rim positioned around said wheel section but spaced therefrom, resilient members arranged between said rim and said wheel section, said wheel section having a plurality of large bores extending therethrough parallel to the axis, and a plurality of small bores extending therethrough parallel to the axis, a metal plate secured to said rim on each side and fitting over the outer part of said wheel section and a plurality of bolts for connecting said plates, said bolts when in one position extending through said large bores and when in another position extending through said small bores, said bolts being of a size to snugly fit the small bores but spaced appreciably from the walls of the large bores whereby when the bolts are in the large bores said resilient members may function and when in the small bores the rim is rigidly connected with the wheel section.

3. A wheel for automobiles and other vehicles, comprising an inner wheel section having a plurality of large bores and a plurality of small bores equally spaced apart, a rim spaced from said wheel section, a rubber tire mounted on said rim, a plurality of cushion means arranged between said rim and said wheel section, a pair of ring plates rigidly secured to said rim and overlapping the outer part of said wheel section including said bores, and a series of bolts for connecting said plates, said bolts being positioned at one time to extend through the plates and the large bores and another time through the plates and small bores.

MICHAEL W. WALLACE.